Figures 1, 2, 3:
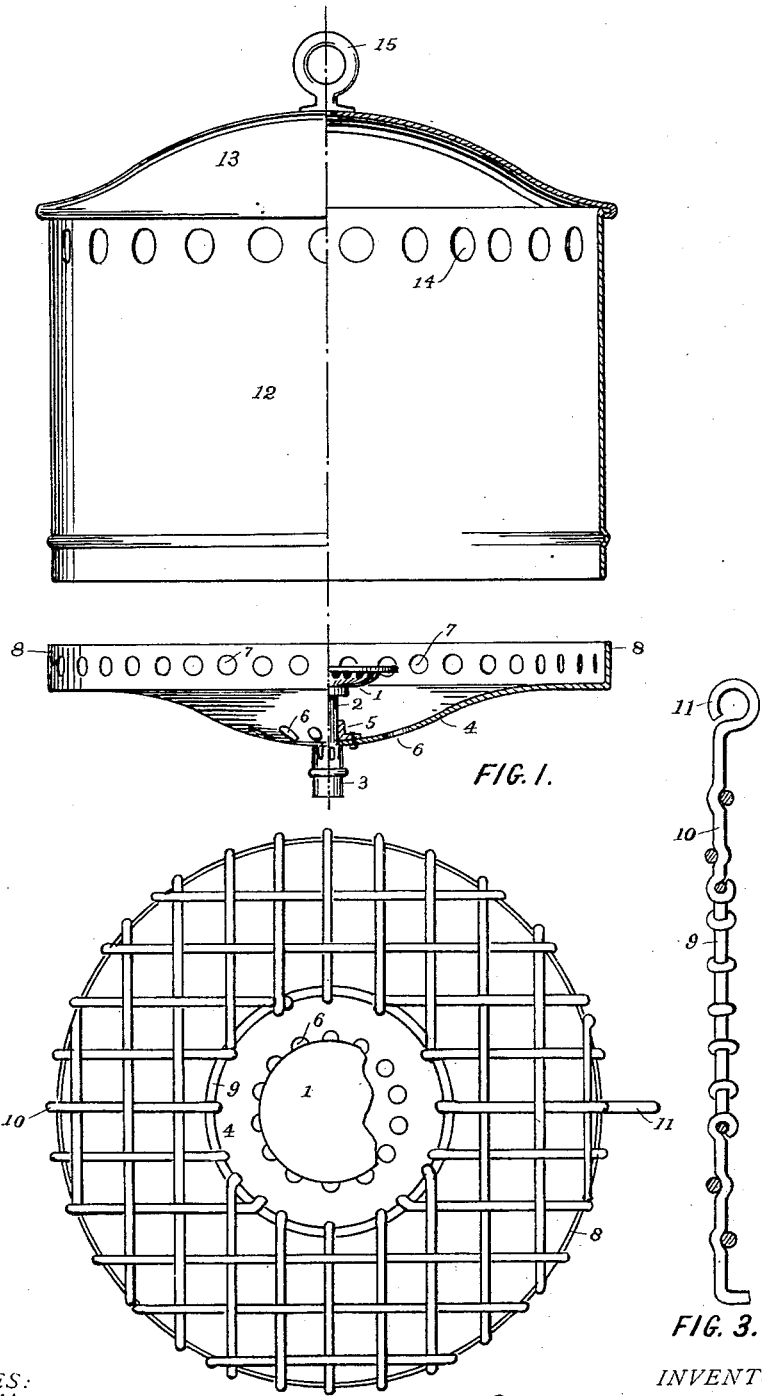

No. 630,999. Patented Aug. 15, 1899.
L. H. STODDARD.
GAS STOVE.
(Application filed Feb. 18, 1898.)
(No Model.)

WITNESSES:
C. P. Alber
J. A. Lehman

INVENTOR.
Lyman H. Stoddard
BY
Emil F. Gennert
HIS ATTORNEY.

UNITED STATES PATENT OFFICE.

LYMAN H. STODDARD, OF NEW YORK, N. Y.

GAS-STOVE.

SPECIFICATION forming part of Letters Patent No. 630,999, dated August 15, 1899.

Application filed February 18, 1898. Serial No. 670,770. (No model.)

*To all whom it may concern:*

Be it known that I, LYMAN H. STODDARD, a citizen of the United States of America, and a resident of the borough of Brooklyn, city of New York, county of Kings, State of New York, have invented certain new and useful Improvements in Gas-Stoves for Heating and Cooking, of which the following is a specification.

My invention relates to improvements in gas-stoves for heating and cooking purposes; and the objects are to produce a combined cooking and heating stove effective when used for either purpose, to simplify construction, and to make them attachable to existing gas-fixtures. I accomplish these objects by the combination of parts shown in the accompanying drawings, in which—

Figure 1 is a view of the base and heating-hood slightly separated, partly in section and partly in elevation. Fig. 2 is a plan view of the base and lower part of stove shown arranged as a cooking-stove, the burner-plate being broken away to show air-holes; and Fig. 3 is a cross-sectional view of the wire-netting shown in Fig. 2.

Similar numbers of reference refer to similar parts in the views.

To make my stove easily attachable to existing gas-fixtures, I prefer to use a so-called "monitor" or atmospheric burner, composed of a plate 1, mixing-chamber 2, and base 3, having either a standard thread in the base or making it tapering and smooth on the inside, so that it will slip over a gas burner or pillar and make a gas-tight joint. A metal plate or shell 4, preferably stamped or spun, is provided with a central hole, which fits down on the pillar or mixing-chamber 2 of the monitor burner. To reinforce the shell at that point, I make use of a flanged collar 5, attached by rivets or otherwise to the base-shell around the central hole. The socket may slip over or be screwed down on the pillar, as shown. To support combustion of the gas, the base-shell is perforated by a series of holes 6 in the socket and has openings 7 around the vertical flange 8 around the periphery of the base-plate, as shown. This flange is part of the base-shell and extends upward high enough so that the upper edge will be, say, one-quarter of an inch above the plate of the monitor burner 1, so that if vessels for cooking purposes are placed upon the stove the vessels will rest on the upper edge of the flange, permitting the flames issuing from the burner to strike the bottom of the vessel to the best advantage, the openings 7 in the vertical annular flange allowing the heat to escape. In order to support vessels of a smaller diameter than the flange 8, like cups, &c., I make use of a circular piece of wire-netting 10, of coarse mesh, which netting is provided with a downwardly-bent portion on the outer edge, so as to fit over the flange. A loop 11 for handling the netting is left at the edge, as shown. So that the center of the netting will not burn out, I provide an enlarged opening 9, of greater diameter than the burner, in the center. With this netting in place and without the radiating-hood the stove is used for cooking purposes.

It is obvious that by using a monitor or other plate Bunsen burner cups and small vessels will rest directly on the burner-plate, in which case the wire-netting 10 is not required.

To use as a heating-stove, the wire-netting 10 (shown in plan view in Fig. 2) is removed and the radiating-hood 12 is set down on the base-shell. This hood is a cylinder of sheet metal closed at top by a cover 13, which is firmly secured to the cylinder. Below the cover the cylinder is perforated with a series of holes 14 for the purpose of ventilation and to let the heat generated by the burner escape, the holes in the flange of the base being closed off by the lower edge of the cylinder when in position on the inside of flange 8. A ring 15 or an ornamental knob is placed centrally in the cover, so that the cylinder can be removed. When used as a heating-stove, the radial jets issuing from the burner carry the heat outwardly toward the cylinder, drawing in and heating the air which enters up through the perforations in the bottom of the base-plate and heating the cylinder on the inside. The heat is radiated from the outer surface of the cylinder, the heat of the burner and products of combustion passing out through the perforations 14 at upper end of cylinder.

Arranged as either a heating or cooking stove it will be noticed that the flame is always inclosed, so that if used on a bracket near a curtain or other textile fabric there is no danger of the flame coming in contact with it. By having the radiating-hood removable the stove can be converted instantly and used for either heating or cooking, and by arranging the parts with relation to each other as described the best results in either case are obtained—i. e., for heating water, milk, and the like the flame is brought into direct contact with the vessel containing the liquid, which causes rapid heating, and when used for heating a small room and the cylindrical hood is placed on the base-shell the hood will throw off considerable heat by radiation.

By using a Bunsen atmospheric burner, like the monitor, a smokeless flame is obtained. It is a staple article, and being very economical in its consumption of gas it is very desirable for use in my improved stove.

Having fully described my invention, what I claim as new, and desire to secure by Letters Patent of the United States, is—

1. The herein-described base for a convertible heating and cooking gas-stove, the same consisting of a plate having a central hole in its body surrounded by a series of perforations, and provided with an upwardly-extending perforated flange around its periphery, a burner passing through the central hole and terminating short of the edge of the flange, and a collar secured to the plate around the central hole and adapted to embrace the burner, substantially as and for the purpose set forth.

2. The herein-described convertible heating and cooking gas-stove, consisting of a base-plate having a central hole in its body surrounded by a series of perforations, and provided with an upwardly-extending flange around its periphery; a burner passing through the central hole and terminating short of the edge of the flange, a collar secured to the plate around the central hole for embracing the burner, and an independent member provided in its body with openings and adapted to engage the base-plate remote from the burner, substantially as and for the purpose set forth.

3. In a convertible heating and cooking gas-stove, the combination with a burner, a base-plate surrounding the burner, and a perforated flange around the periphery of said plate; of a wire-netting, having an enlarged opening at its center, a downwardly-extending portion around its edge and a loop at one point thereof, said netting being adapted to rest upon the edge of, and engage the flange of the base-plate to convert the same into a cooking-stove, substantially as described.

Signed by me at New York city this 16th day of February, 1898.

LYMAN H. STODDARD.

Witnesses:
E. WHITNEY,
J. F. CUNNINGHAM.